United States Patent
Hayashi (10) Patent No.: US 8,542,454 B2
(45) Date of Patent: Sep. 24, 2013

(54) MAGNETIC READING AND WRITING DEVICE

(75) Inventor: Takashi Hayashi, Nagano (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 164 days.

(21) Appl. No.: 13/271,176

(22) Filed: Oct. 11, 2011

(65) Prior Publication Data

US 2012/0176699 A1 Jul. 12, 2012

(30) Foreign Application Priority Data

Jan. 6, 2011 (JP) ................................ 2011-001336

(51) Int. Cl.
*G11B 5/02* (2006.01)
(52) U.S. Cl.
USPC .............................. 360/27; 360/25
(58) Field of Classification Search
None
See application file for complete search history.

(56) References Cited

U.S. PATENT DOCUMENTS 5,798,885 A 8/1998 Saiki et al.
7,072,637 B2 * 7/2006 Makela et al. ............. 455/343.2

FOREIGN PATENT DOCUMENTS

JP 08-045007 A 2/1996
JP 2009-129532 A 6/2009

* cited by examiner

*Primary Examiner* — Paul Huber
(74) *Attorney, Agent, or Firm* — Rabin & Berdo, P.C.

(57) ABSTRACT

In a magnetic reading/writing device, a controller derives at each radius of a recording medium a slope of a curve of track-averaged write performance with respect to an adjustment parameter, and determines a first set of fitting coefficients of a first equation approximating the derived slopes in terms of a first variable representing each radius. The controller acquires write performance dependence on a variable representing each of multiple circumferential positions of the medium by measuring track average write performance with respect to the circumferential positions, and determines a second set of fitting coefficients to approximate by a periodic function the acquired dependence in terms of the first variable. The controller corrects a condition value representing the adjustment parameter by subtracting from the condition value an adjustment value obtained from functions calculated with the first and second sets of fitting coefficients.

16 Claims, 7 Drawing Sheets

MAGNETIC READING AND WRITING DEVICE

CROSS-REFERENCE TO RELATED APPLICATION

This application claims priority under 35 U.S.C. §119 from Japanese Patent Application 2011-001336, filed Jan. 6, 2011, the entirety of which is incorporated herein by reference.

BACKGROUND OF THE INVENTION

1. Field of the Invention

This invention relates to a magnetic reading and writing device and a controller of the device.

2. Description of the Related Art

In current hard disk drives, in order to raise recording densities to the extent possible and realize large recording capacities for specific combinations of magnetic reading and writing heads and a magnetic recording medium, processing has been performed to optimize the recording current and track density, as well as the heater power for control of the flying height of the magnetic reading and writing heads. Optimum conditions differ depending on the radius, due to the circumferential speed dependence and skew dependence of the head flying characteristics, as well as the radial dependence of the magnetic characteristics of the magnetic recording medium. Hence, in general, optimization processing depending on the radius has been performed in a magnetic recording system. Specifically, the write current, distance between tracks (hereafter called the "track pitch"), linear recording density, as well as the heater power for the flying height control are selected so as to maximize the recording density at each radius, as a result of which drive storage capacity is optimized.

Japanese Patent Application Laid-open No. H8-45007 discloses a magnetic disk device which performs correction of writing signals and reproduced waveforms is disclosed. In the magnetic disk device, when data is received from a higher-level device during operation, a recording system converts the data into recording signals and outputs the signals to the magnetic head, thereby recording the recording signals on the magnetic disk. At this time, a preshifter performs correction such as delaying the recording signals. The correction amount in this case is calculated by recording correction amount calculation means based on the peak position of a reproduced waveform. On the other hand, a reading system of the device converts readout waveforms read by the magnetic head from the magnetic disk into data, and outputs the data to a higher-level device. At this time, the filter corrects the amplitude and similar of the readout waveforms. The correction amount in this case is calculated by read/write correction amount calculation means, based on the pulse width of the readout waveforms (see paragraphs [0008] and [0009] of Japanese Patent Application Laid-open No. H8-45007). In accordance with this device, by calculating a correction amount in advance for each track, the correction amount which absorbs scattering at the time of magnetic disk manufacture and the like can be calculated (see paragraphs [0021], [0026] and [0027], and similar of Japanese Patent Application Laid-open No. H8-45007).

Further, Japanese Patent Application Laid-open No. 2009-129532 discloses a mechanism which, in order to compensate readout signal output, uses a heater for control of the flying height of a magnetic read/write head.

In an actual magnetic recording medium, there are cases in which there is a gentle characteristic distribution not only in the radial direction, but in the circumferential direction as well. If reading and writing optimization processing is performed using such a magnetic recording medium with a dependence only on the radial direction, as in the prior art, then it is possible that the recording capacity will be greatly inferior to what should in principle be obtained when performing optimization which includes a dependence on the circumferential position as well. In particular, where the write performance is concerned, when there is unevenness in the circumferential position, under constant conditions in the circumferential position, the write width is broad in portions where the write performance is high and the track pitch cannot be narrowed. Conversely, in portions where the write performance is low, under conditions optimized for portions with high write performance, there is the concern that write performance will be inadequate.

SUMMARY OF THE INVENTION

This invention was devised in light of the above problems, and has as an object the provision of a magnetic reading and writing device which can perform reading and writing optimization processing which depends on the circumferential position as well, without requiring the addition of considerable resources compared with conventional optimization methods.

In order to attain the above object, a first mode of the invention is a magnetic reading and writing device, which includes a magnetic head, a magnetic recording medium, nonvolatile memory, and a controller. The magnetic head has a magnetic read/write function and a flying height control function. On and from the magnetic recording medium, reading and writing are performed by the magnetic head. The nonvolatile memory stores a write current, a track pitch, a linear recording density and a flying height control heater power, selected such that the recording density is maximum at each radius of the magnetic recording medium. The controller as a first optimization means, derives, taking the write current or the flying height control heater power as a write performance adjustment parameter, a slope of a track average write performance with respect to the write performance adjustment parameter at each of a plurality of radii of the magnetic recording medium. The controller also stores in the nonvolatile memory a first set of fitting coefficients for a case in which the slope is approximated by a polynomial equation for the radius of the magnetic recording medium. The controller, as a second optimization means, acquires the circumferential position dependence of the write performance at each of the plurality of radii of the magnetic recording medium, using the write current, the track pitch, the linear recording density and the flying height control heater power stored in the nonvolatile memory. The controller stores in the nonvolatile memory a second set of fitting coefficients obtained by approximating the circumferential position dependence by a periodic function. The controller, as a correction means, uses a track-averaged write performance change rate which is a function of the radius and is calculated using the first set of fitting coefficients, and a local write performance function which is a function of the radius and circumferential position and is calculated using the second set of fitting coefficients, to correct the write performance adjustment parameter at each of the radii and in each of circumferential positions by subtracting a value of (local write performance function−track-averaged write performance)/track-averaged write performance change rate.

Further, a second mode of the invention is characterized in that, in the first mode, the write performance adjustment parameter is the write current.

Further, a third mode of the invention is characterized in that, in the first mode, the write performance adjustment parameter is the flying height control heater power.

Further, a fourth mode of the invention is characterized in that, in any one of the first through third modes, the degree of the radius r of the track-averaged write performance change rate is 3 or higher and 5 or lower.

By means of this invention, a magnetic reading and writing device can be provided with a local write performance function to correct the write performance adjustment parameter (the write current or the flying height control heater power). The local write performance function is a function of the radius and the circumferential position obtained by approximating the circumferential position dependence of the write performance of a magnetic head for a magnetic recording medium. By this means, reading and writing optimization processing which also depends on the circumferential position can be performed, without requiring the addition of considerable resources compared with conventional optimization methods.

DESCRIPTION OF THE PREFERRED EMBODIMENTS

Below, embodiments of the invention are explained in detail referring to the drawings.

Figure 1:
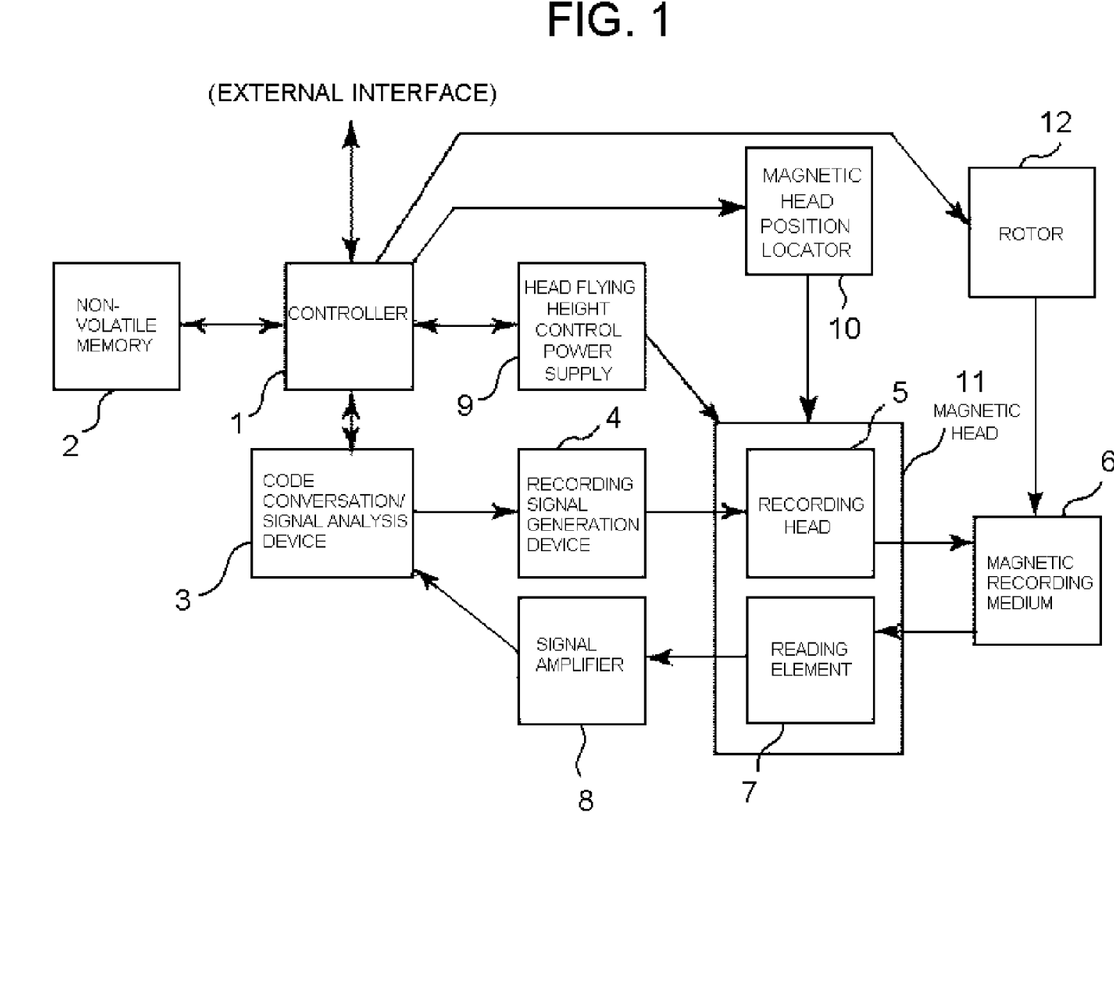
FIG. 1 shows the magnetic reading and writing device of one embodiment of the invention.

FIG. 1 shows the magnetic reading and writing device of one embodiment of the invention. A controller 1 controls a rotor 12 connected to a magnetic recording medium 6, issues reading and writing instructions to a code conversion/signal analysis device 3, exchanges data with an external interface, and similar, and in addition handles optimization processing for the combination of a magnetic head 11 and the magnetic recording medium 6. Further, instructions to a head flying height control power supply 9 are output according to a read/write position. In nonvolatile memory 2, various types of information, including fitting coefficients described below, are held. Examples of non-volatile memory include read-only memory, flash memory, ferroelectric RAM, most types of magnetic computer storage devices (e.g. hard disks, floppy disks, and magnetic tape), optical discs.

Figure 2:
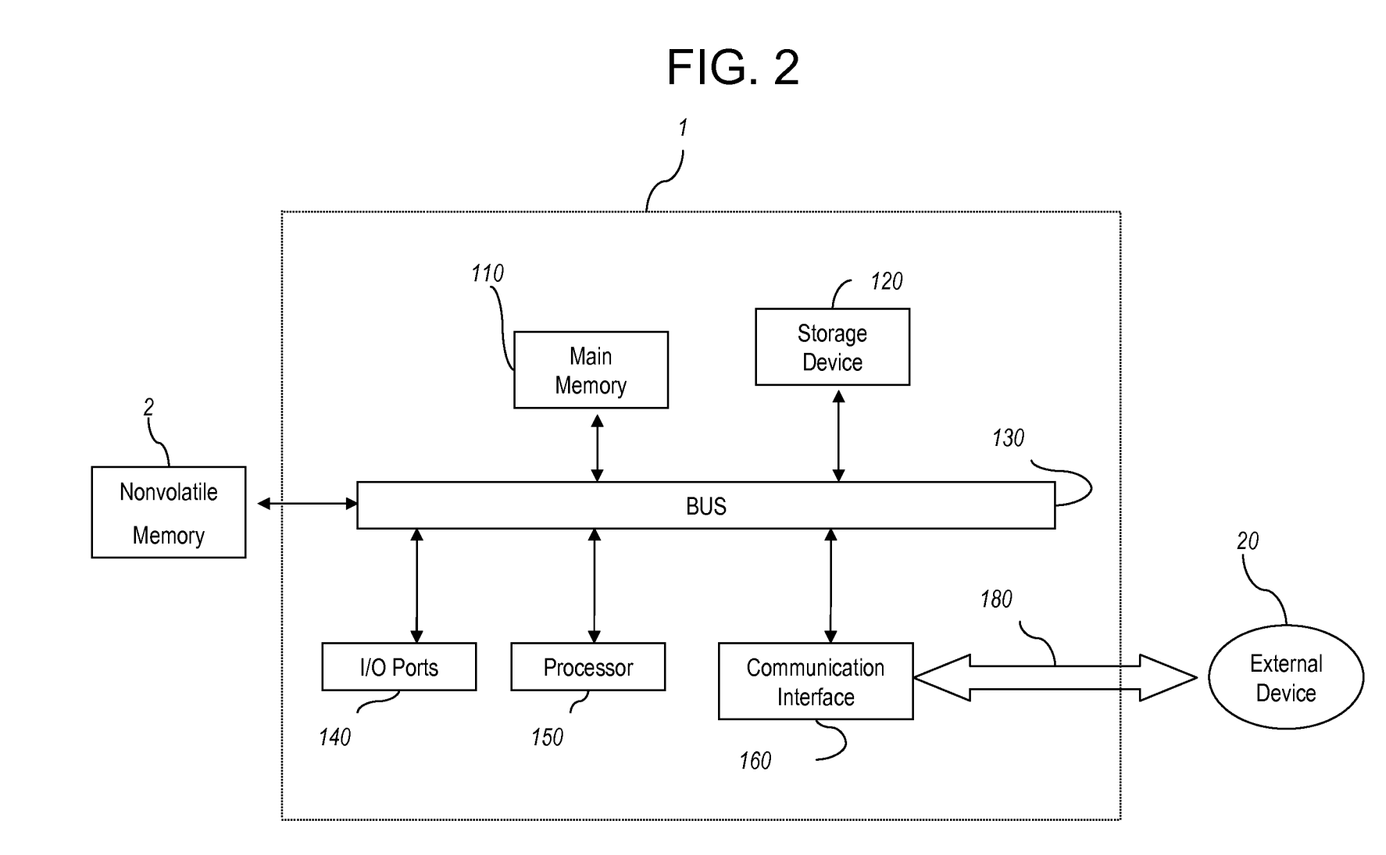
FIG. 2 shows a controller of the magnetic reading and writing device according to one embodiment of the invention.

The controller 1 may be a general purpose computer or a dedicated special purpose hardware item, and the optimization processing may be performed by hard-wired logics or software/firmware stored in a memory. FIG. 2 shows one example configuration of the controller 1. The controller 1 may include a bus 130 or other communication mechanism for communicating information and a processor 150 coupled with the bus 130 for processing the information. The controller 1 also may include a main memory 110, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by the processor 150. In addition, main memory 110 may be used for storing temporary variables or other intermediate information during execution of instructions to be executed by processor. A storage device 120, such as a magnetic disk or optical disk, may be provided and coupled to the bus 130 for storing information and instructions. This storage device is an example of a computer readable medium, upon which the program may be encoded. The controller 1 also may include input/output ports 140 to input signals to couple the controller 1. Such coupling may include direct electrical connections, wireless connections, networked connections, etc., for implementing automatic control functions, remote control functions, etc. Suitable interface cards may be installed to provide the necessary functions and signal levels. The controller 1 also may include a communication interface 160 coupled to the bus 130. The communication interface 160 may provide a two-way data communication coupling to a communication link 180 that may be connected to, for example, an external device 20.

The magnetic head 11 has a flying height control heater (not shown), recording head 5, and a reading element 7. The radial position of the magnetic head 11 is set by the magnetic head position locator 10 according to an instruction issued by the controller 1. The magnetic head position locator 10 drives a voice-coil rotator of a magnetic head assembly (not shown) and locates the magnetic head 11 in a right radial position.

A recording signal generation device 4 transmits signals for recording to the recording head 5 based on instructions from the code conversion/signal analysis device 3, and the recording head 5 performs magnetic recording on the magnetic recording medium 6. Information recorded on the magnetic recording medium 6 is captured as signals via the reading element 7. The captured signal, after passing through a signal amplifier 8, is sent to the code conversion/signal analysis device 3, where the recorded information is restored and is sent to the controller 1.

Below, the operation of the magnetic reading and writing device of this embodiment is explained. In optimization processing, the controller 1 performs various processing; at this time, the controller 1 can be viewed as means for executing the various processing.

First, as in conventional optimization methods, the controller 1 performs optimization of the track pitch, linear recording density, write current, and flying height control heater power, with dependence only on the radial direction (step 101). By this means, the physical format is decided. The various values obtained by optimization are stored in the nonvolatile memory 2.

Figure 3:
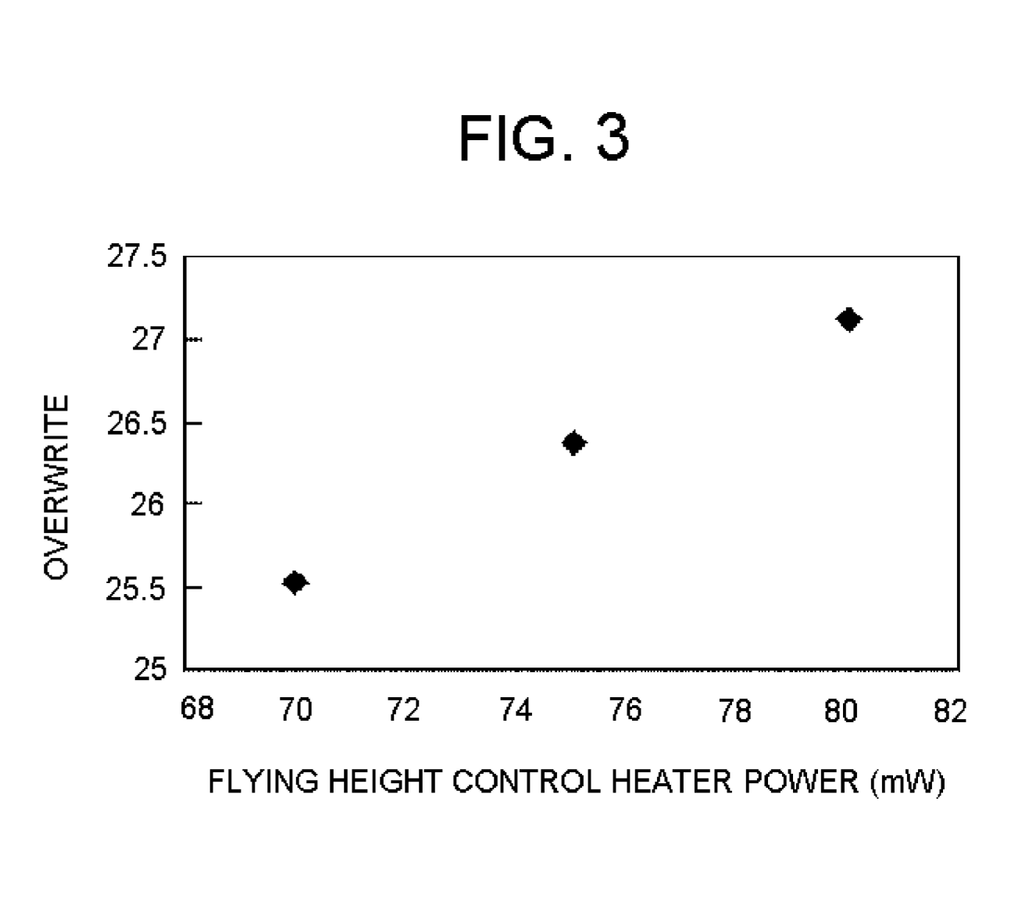
FIG. 3 shows a flying height control heater power dependence of overwriting.

Next, at a plurality of radii, the track-averaged write performance is derived, when the flying height control heater power during writing is shifted, taking as the center the flying height control heater power decided by optimization in step 101 (step 102). This flying height control heater power is a parameter for adjusting the write performance, and is called the "write performance adjustment parameter". FIG. 3 shows an example of measurement for perpendicular magnetic recording. The horizontal axis indicates the flying height control heater power during writing, centered on the flying height control heater power (mW) obtained by optimization depending only on the radial direction, and the vertical axis indicates, as a write performance evaluation value, the "overwrite", defined as the ratio of the remaining intensity of a high-density recorded signal to the initial recorded signal intensity when low-density recording is performed after high-density recording.

The relation of FIG. 3 was fit to a first-degree equation, and the slope $\Delta f/\Delta p$ of the overwrite to the flying height control heater power p during writing was derived (step 103). This was performed at each radius, and fitting coefficients when approximating the slope $\Delta f/\Delta p$ with respect to the radius r by a polynomial equation were determined (step 104). These values were stored in nonvolatile memory 2. These fitting coefficients (corresponding to the "first set of fitting coefficients") can be used at radius r to calculate the track-averaged write performance change rate $(\Delta f/\Delta p)(r)$.

Next, at a plurality of radii, the optimization conditions of step 101 for each radius are used to acquire the circumferential position dependence of the overwrite (step 105). The solid line in FIG. 4 indicates an example for a certain radius. Here, the horizontal axis indicates each of the directions when an entire circumference is divided into N=32 parts, and the vertical axis indicates the overwrite calculated only for that direction.

Figure 4:
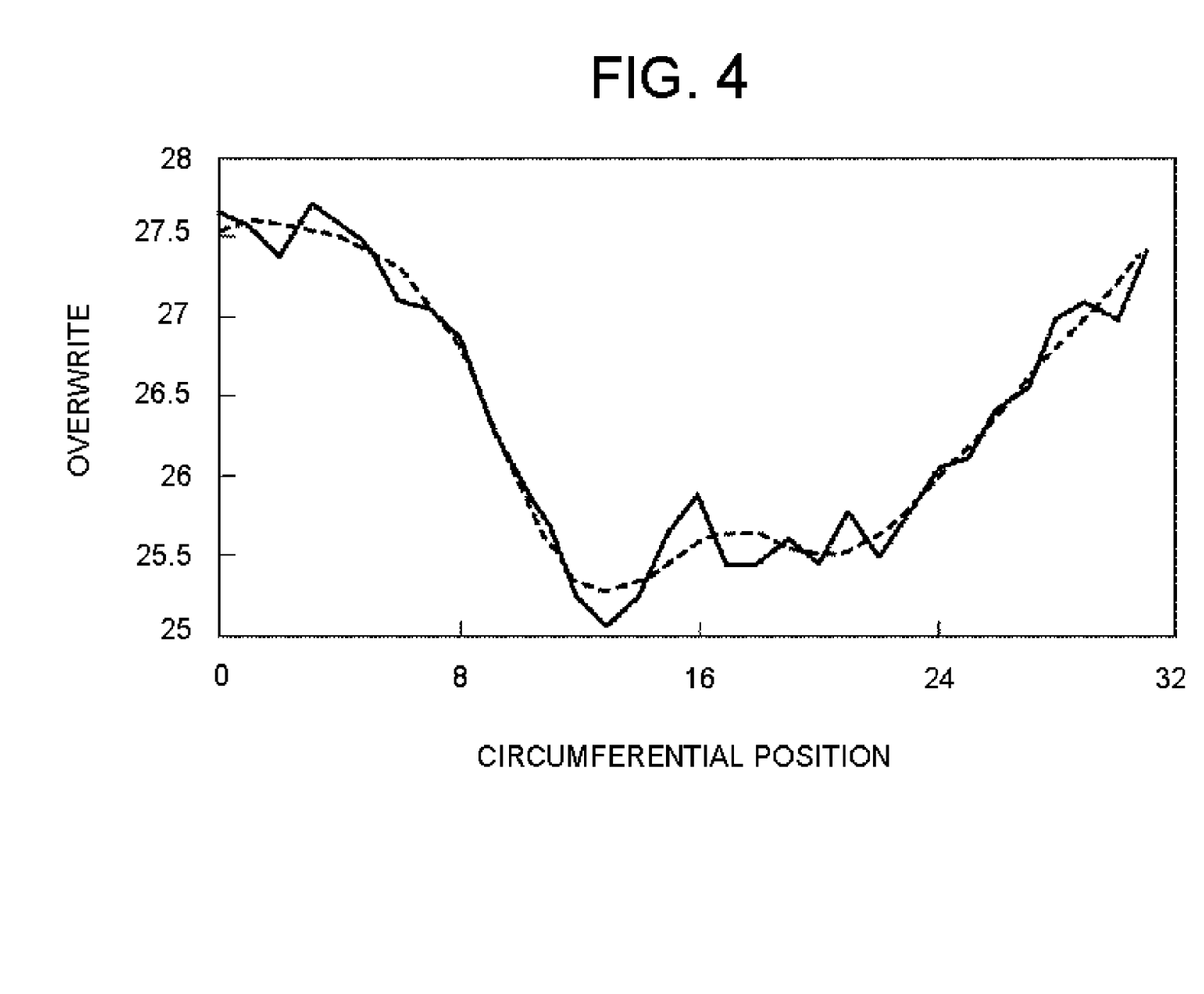
FIG. 4 shows a circumferential position distribution of overwriting (prior to adjustment of the flying height control heater power by circumferential position)

Further, this circumferential position dependence of the overwrite is fit to a periodic function, with one rotation as one period (step 106). That is, when the jth circumferential position overwrite measurement results is f(j), this f(j) is approximated by $$f(j)=a(0)/2+\Sigma'a(k)\cos(2\pi jk/N)+\Sigma'b(k)\sin(2\pi jk/N) \quad (1).$$

Here $\Sigma'$ is the sum for values of k starting from 1. It is assumed that $a(k)=(2/N)\,\Sigma f(j)\cos(2\pi jk/N)$ and $b(k)=(2/N)\,\Sigma f(j)\sin(2\pi kj/N)$. Here $\Sigma$ is the sum for values of j from 0 to N−1.

The broken line in FIG. 4 represents the result of approximation using seven parameters from a(0) to a(3) and b(1) to b(3).

The above-described measurement and fitting are performed for a plurality of radii. Fitting coefficients a(k), b(k) at radius r=r(i) are denoted by a(i,k) and b(i,k) respectively. The fitting coefficients when the relation between these coefficients a(i,k) and b(i,k) to r=r(i) is approximated by a polynomial equation with respect to the radius r (corresponding to the "second set of fitting coefficients") are determined (step 107). These values are stored in the nonvolatile memory 2. On the basis of the stored fitting coefficients, functions a(r,k) and b(r,k) of the radius r are obtained.

Finally, shifts $\Delta f(r,j)$ from the track averages at radius r and circumferential position j of the local write performance function f(r,j) expressing the local write performance is calculated, removing the constant term in equation (1):

$$\Delta f(r,j)=\Sigma'a(r,k)\cos(2\pi kj/N)+\Sigma'b(r,k)\sin(2\pi kj/N) \quad (2)$$

(step 108).

The heater power p(r) optimized in the radial direction is modified to obtain the heater power for a direction j, p(r,j):

$$p(r,j)=p(r)-\Delta f(r,j)/(\Delta f/\Delta p)(r) \quad (3)$$

and actual recording is performed (step 109).

The radial-direction distribution is normally gentle, and so it is desirable that the degree of the polynomial approximation not be made too high. For example, from 3 to 5 degrees or so is desirable. The number of samplings exceeding (the number of polynomial equation degrees+1) is sufficient.

Further, each of the above-described processing can be performed in any order, so long as ultimately the heater power p(r,j) can be corrected.

In the above explanation, the flying height control heater power during writing was used as the write performance adjustment parameter; but the write current may be used. With respect to minute changes, increasing the flying height control heater power and increasing the write current induce similar actions. That is, there is the tradeoff that as the write performance is increased (and consequently the linear recording densities is raised), the write width increases (the track pitch worsens), and so the recording density is raised by performing optimization which includes a dependence on the circumferential position, as described below.

Figure 5:
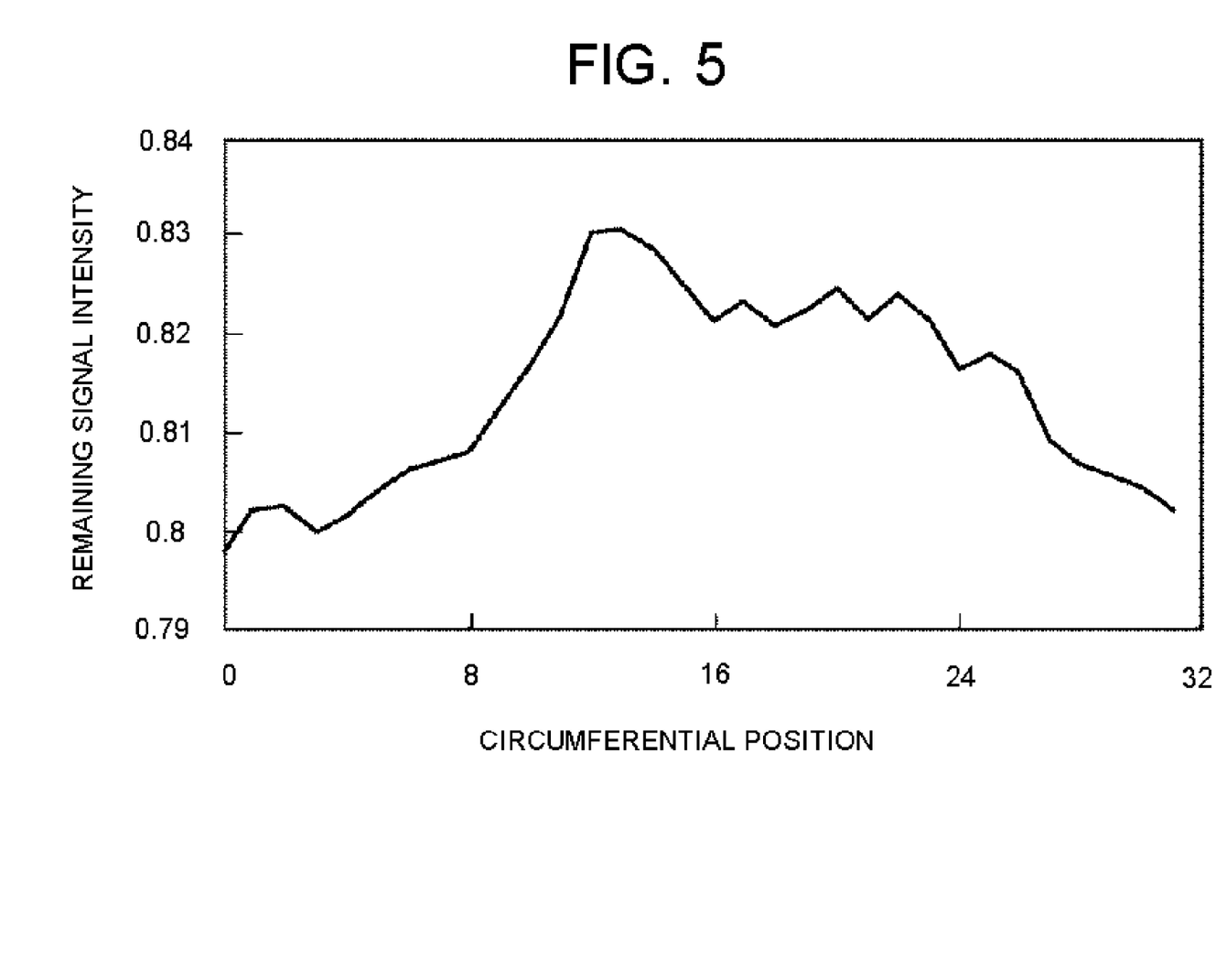
FIG. 5 shows a circumferential position distribution of the center track remaining signal intensity for adjacent track erasure (prior to adjustment of the flying height control heater power by circumferential position)

In optimization by this method, high recording densities can be realized as follows. In the magnetic reading and writing device shown in FIG. 1, FIG. 5 shows the results of measurement of the circumferential position dependence of the remaining signal intensity at the original track center, when a rectangular wave was recorded on a track sector, and erasure was then performed at a position distant by the track pitch from the track center. If this value cannot be maintained at a fixed value or higher (generally approximately 80%), the signal recorded on the original track cannot be correctly reproduced as a result of recording on the adjacent track.

Figure 6:
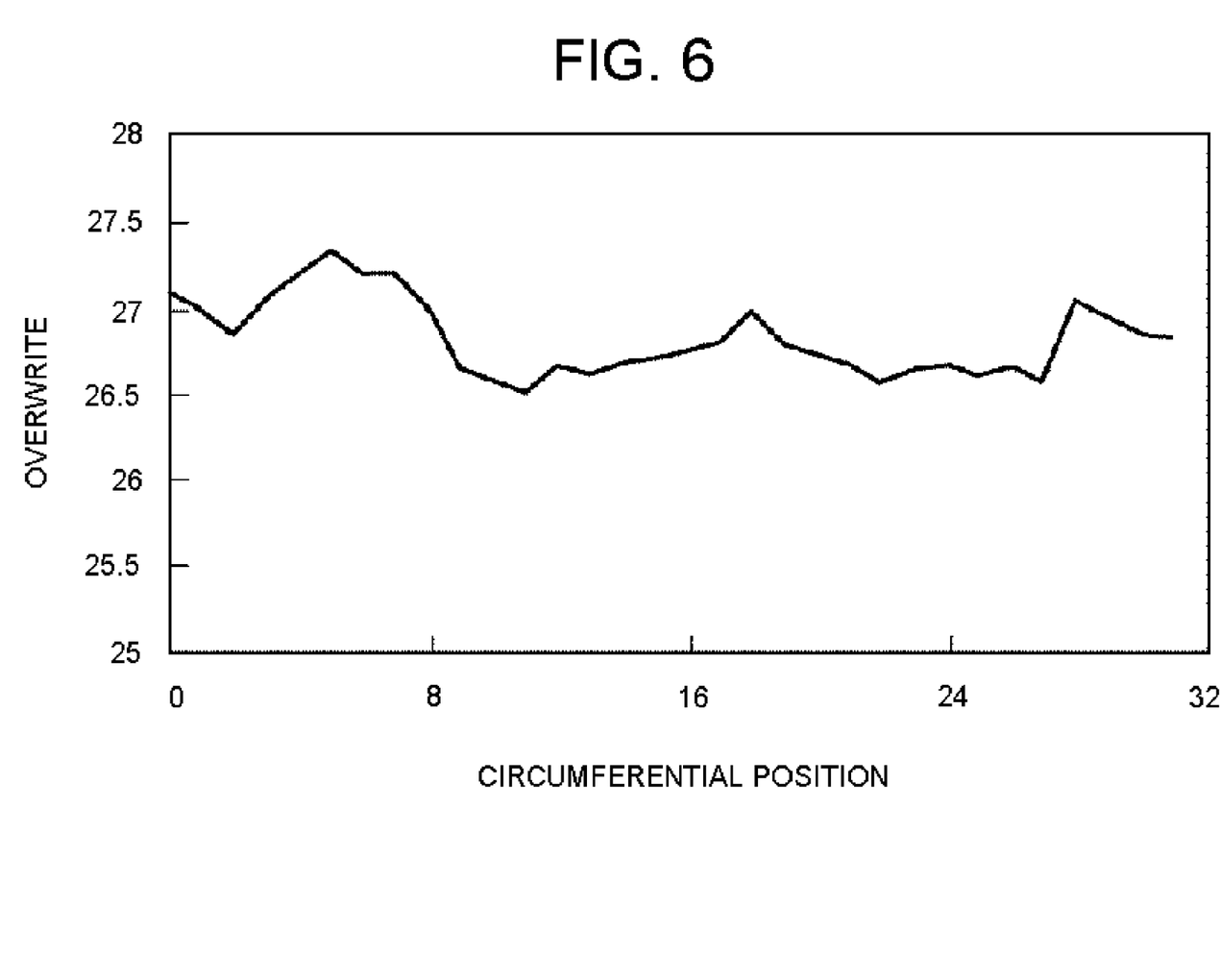
FIG. 6 shows a circumferential position distribution of overwriting (after adjustment of the flying height control heater power by circumferential position)
Figure 7:
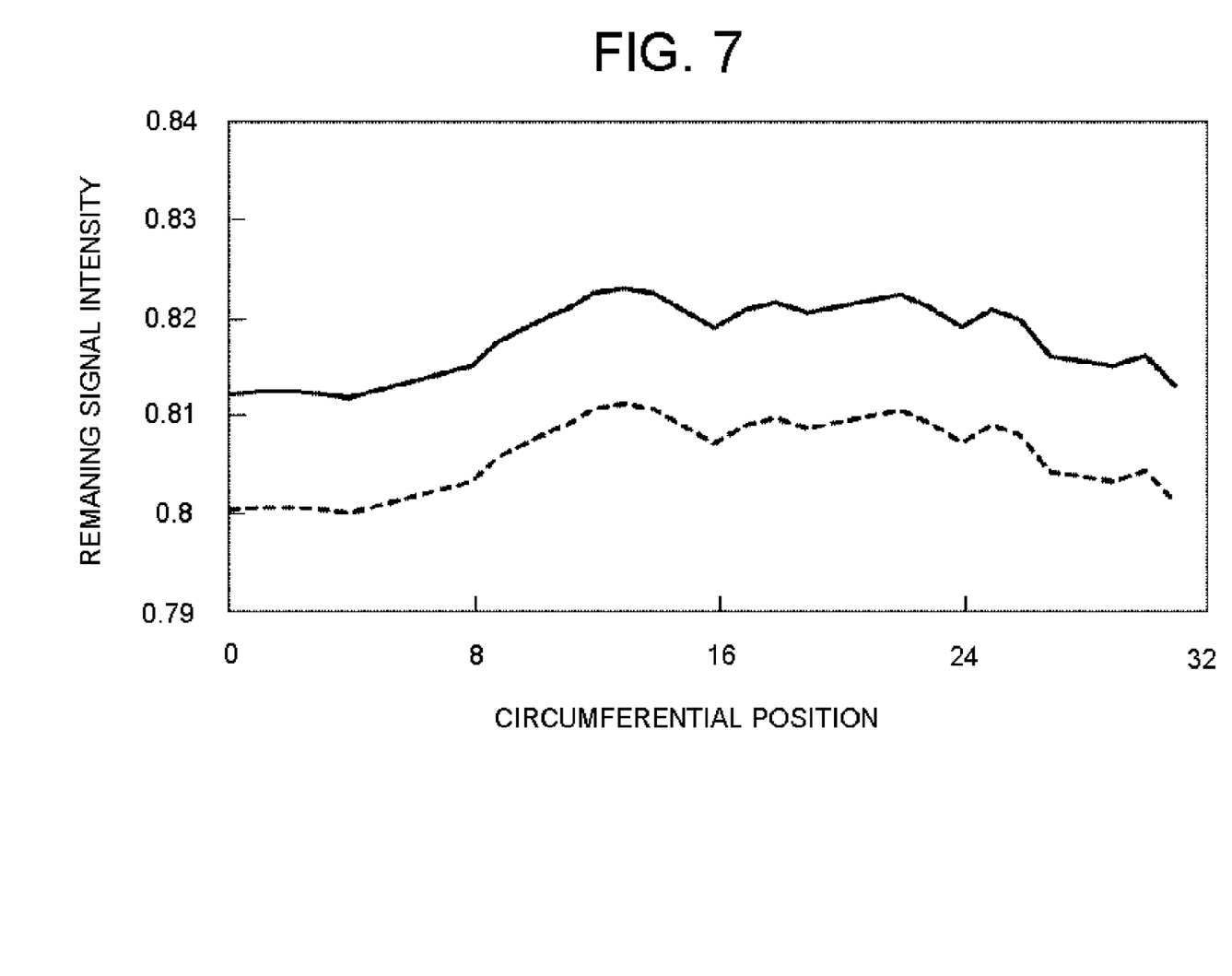
FIG. 7 shows a circumferential position distribution of the center track remaining signal intensity for adjacent track erasure (after adjustment of the flying height control heater power by circumferential position).

FIG. 6 and FIG. 7 respectively show the circumferential position dependence of the overwrite and the circumferential position dependence of the remaining signal intensity upon adjacent track erasure, upon performing heater power adjustment during writing by angle according to equation (3). Specifically, the flying height control heater power at each circumferential position was set, relative to the heater setting prior to adjustment, to a value reduced by (overwrite measured value at the circumferential position−circumferential position average value of overwrite)/1.6.

By means of the control indicated by equation (3), the circumferential position dependence not only of overwrite, but also of remaining signal intensity upon adjacent track erase is also reduced. In FIG. 7, the solid line represents measurements at the track pitch, obtained as the result using the conventional optimization method of step 101, and the broken line represents measurements with the track pitch reduced to 95%. The broken line of FIG. 7 and the minimum values in FIG. 5 substantially coincide; this fact indicates that by means of the control of equation (3), 5% reduction of the track pitch (an increase by 5% in the track density) is possible.

In this method, in addition to the optimization by radius of the prior art, control based on the angle, as well as storage capacity for this control, are necessary; but the data to be stored is only fitting coefficients, requiring very little data storage, and no addition of considerable resources over those used in conventional optimization methods is required.

As described above, by adopting this method to perform optimization, the margin accompanying the circumferential position distribution of write performance can be reduced when performing optimization, so that even when optimizing for the combination of the same magnetic head and magnetic recording medium, higher densities can be attained compared with conventional optimization methods.

What is claimed is:
1. A magnetic reading and writing device, comprising:
a magnetic head for performing a magnetic reading/writing and a flying height control;

a magnetic recording medium from and on which the reading/writing is performed by the magnetic head;

nonvolatile memory which stores a set of condition values at each radius of a plurality of radii of the medium, the stored condition values being selected such that a recording density is maximized at each radius;

first means for deriving, at each radius, a respective slope of a curve of track-averaged write performance with respect to an adjustment parameter, for determining a first set of fitting coefficients of a first equation approximating the derived slopes in terms of a first variable representing each radius, and for storing the first set of fitting coefficients in the memory;

second means for acquiring write performance dependence on a second variable representing each of a plurality of circumferential positions of the medium by measuring, under a condition set by the stored set of condition values at each radius, track average write performance with respect to the plurality of circumferential positions, for determining a second set of fitting coefficients to approximate by a periodic function the acquired dependence in terms of the first variable, and for storing the determined second set of fitting coefficients in the memory; and correction means for correcting a condition value among the stored condition values at a particular radius, which is a value representing the adjustment parameter, by subtracting from the condition value an adjustment value obtained from a first function and a second function that are respectively calculated with the first and second sets of fitting coefficients.

2. The magnetic reading and writing device according to claim 1, wherein the adjustment value is the ratio of a shift value at the particular radius and a particular circumferential position, to a slope value obtained from the first function at the particular radius, the shift value being the difference between a track-averaged performance value at the particular radius and a local write performance value obtained from the second function at the particular radius and the particular circumferential position.

3. The magnetic reading and writing device according to claim 1, wherein the set of condition values includes values representing a write current, a track pitch, a linear recording density and a flying height control heater power.

4. The magnetic reading and writing device according to claim 1, wherein the adjustment parameter is a write current.

5. The magnetic reading and writing device according to claim 1, wherein the adjustment parameter is a flying height control heater power.

6. The magnetic reading and writing device according to claim 1, wherein the second set of fitting coefficients is a set of fitting coefficients of a second equation approximating a relation between a set of coefficients of the periodic function and the first variable.

7. The magnetic reading and writing device according to claim 6, wherein the first and second equations are polynomial equations.

8. The magnetic reading and writing device according to claim 7, wherein the respective degree of the first and second polynomial equations is greater than or equal to 3 and smaller than or equal to 5.

9. A controller for optimizing condition values of a magnetic reading and writing device that includes a magnetic head for performing a magnetic reading/writing and a flying height control and a magnetic recording medium from and on which the reading/writing is performed by the magnetic head, the controller comprising:

storing means for storing in a nonvolatile memory a set of condition values at each radius of a plurality of radii of the medium, the stored condition values being selected such that a recording density is maximized at each radius;

first means for deriving, at each radius, a respective slope of a curve of track-averaged write performance with respect to an adjustment parameter, for determining a first set of fitting coefficients of a first equation approximating the derived slopes in terms of a first variable representing each radius, and for storing the first set of fitting coefficients in the memory;

second means for acquiring write performance dependence on a second variable representing a plurality of circumferential positions of the medium by measuring, under a condition set by the stored set of condition values at each radius, track average write performance with respect to the plurality of circumferential positions, for determining a second set of fitting coefficients to approximate by a periodic function the acquired dependence in terms of the first variable, and for storing the determined second set of fitting coefficients in the memory; and correction means for correcting a condition value among the stored condition values at a particular radius, which is a value representing the adjustment parameter, by subtracting from the condition value an adjustment value obtained from a first function and a second function that are respectively calculated with the first and second sets of fitting coefficients.

10. The controller according to claim 9, wherein the adjustment value is the ratio of a shift value at the particular radius and a particular circumferential position, to a slope value obtained from the first function at the particular radius, the shift value being the difference between a track-averaged performance value at the particular radius and a local write performance value obtained from the second function at the particular radius and the particular circumferential position.

11. The controller according to claim 9, wherein the set of condition values includes values representing a write current, a track pitch, a linear recording density and a flying height control heater power.

12. The controller according to claim 9, wherein the adjustment parameter is a write current.

13. The controller according to claim 9, wherein the adjustment parameter is a flying height control heater power.

14. The controller according to claim 9, wherein the second set of fitting coefficients is a set of fitting coefficients of a second equation approximating a relation between a set of coefficients of the periodic function and the first variable.

15. The controller according to claim 14, wherein the first and second equations are polynomial equations.

16. The controller according to claim 15, wherein the respective degree of the first and second polynomial equations is greater than or equal to 3 and smaller than or equal to 5.

* * * * *